(12) United States Patent
Yin et al.

(10) Patent No.: US 10,070,123 B1
(45) Date of Patent: Sep. 4, 2018

(54) APPARATUSES, SYSTEMS, AND METHODS FOR CHARACTERIZING AND CALIBRATING DISPLAYS

(71) Applicant: Oculus VR, LLC, Menlo Park, CA (US)

(72) Inventors: Ye Yin, Pleasanton, CA (US); Simon Hallam, San Jose, CA (US)

(73) Assignee: Oculus VR, LLC, Menlo Park, CA (US)

( * ) Notice: Subject to any disclaimer, the term of this patent is extended or adjusted under 35 U.S.C. 154(b) by 0 days.

(21) Appl. No.: 15/676,830

(22) Filed: Aug. 14, 2017

(51) Int. Cl.
*H04N 17/00* (2006.01)
*G09G 5/10* (2006.01)
*G09G 3/20* (2006.01)
*H04N 5/372* (2011.01)

(52) U.S. Cl.
CPC ......... *H04N 17/004* (2013.01); *G09G 3/2092* (2013.01); *G09G 5/10* (2013.01); *H04N 5/372* (2013.01); *G09G 3/2003* (2013.01); *G09G 2320/0626* (2013.01); *G09G 2320/0666* (2013.01); *G09G 2320/0693* (2013.01); *G09G 2360/141* (2013.01); *G09G 2360/145* (2013.01)

(58) Field of Classification Search
CPC ............................ G02B 27/0172; H04N 7/142
USPC ......................... 348/189, 188, 192, 175, 180
See application file for complete search history.

(56) References Cited

U.S. PATENT DOCUMENTS

| | | | |
|---|---|---|---|
| 5,577,981 A * | 11/1996 | Jarvik | A63B 21/154 434/247 |
| 6,459,955 B1 * | 10/2002 | Bartsch | A47L 9/00 318/568.11 |
| 7,170,677 B1 * | 1/2007 | Bendall | A61B 1/0005 348/49 |
| 7,564,626 B2 * | 7/2009 | Bendall | A61B 1/0005 359/462 |
| 9,299,291 B2 * | 3/2016 | Maeyama | G09G 3/3291 |
| 2008/0106489 A1 * | 5/2008 | Brown | G02B 27/0172 345/9 |
| 2012/0019529 A1 * | 1/2012 | Kimpe | G09G 3/20 345/419 |
| 2014/0043369 A1 * | 2/2014 | Albrecht | G09G 3/2074 345/690 |
| 2015/0077826 A1 * | 3/2015 | Beckman | G02B 27/01 359/238 |
| 2015/0187277 A1 * | 7/2015 | Maeyama | G09G 3/3291 345/694 |

(Continued)

*Primary Examiner* — Paulos M Natnael
(74) *Attorney, Agent, or Firm* — FisherBroyles, LLP

(57) ABSTRACT

A display calibration apparatus may include a display mounting assembly with a mounting platform and a multi-axis positioning device coupled to the mounting platform for adjusting an orientation of the mounting platform. The display calibration apparatus may also include a camera device positioned to receive light emitted by a plurality of sub-pixels of a display mounted on the mounting platform. The camera device may include an image sensor array that captures light emitted by the plurality of sub-pixels of the display. In addition, the display calibration apparatus may include a camera lens and a focuser. The camera lens may be positioned to direct light emitted by the plurality of sub-pixels of the display onto the image sensor array of the camera device, and the focuser may be disposed between the camera device and the camera lens to move the camera lens axially along an optical axis of the camera lens.

20 Claims, 9 Drawing Sheets

(56) References Cited

U.S. PATENT DOCUMENTS

2015/0348489 A1* 12/2015 Kabe .................... G09G 3/3696
345/206
2017/0237152 A1* 8/2017 Lee ........................ H01Q 1/243
343/702

* cited by examiner

APPARATUSES, SYSTEMS, AND METHODS FOR CHARACTERIZING AND CALIBRATING DISPLAYS

BACKGROUND

High-definition displays are increasingly used in a variety of applications, including televisions, personal computers, smartphones, tablets, camera viewfinders, and even virtual reality headsets. High-definition displays commonly include numerous pixels having different color pixel elements (e.g., red, green, and blue sub-pixels) that are independently driven to produce detailed color images that are visible to users. Such displays are typically calibrated so that users properly perceive the intended image colors in the displayed images. To accomplish this, a calibration system may obtain image information from a display in order to identify and apply light-output adjustments to the pixel elements of the display. This image information (sometimes referred to as a display's "profile") is typically generated by measuring the light output of the display's pixel elements during a process commonly referred to as display "characterization."

The ever-increasing pixel density of high-definition displays, however, has made it increasingly difficult for conventional systems to efficiently and accurately characterize (and thus calibrate) high-definition displays. Although imperfect display characterization and calibration may be acceptable for some display environments (such as high-definition televisions intended to be viewed from a distance of multiple feet), these results may be problematic for other display environments, such as virtual reality headsets. For example, because virtual reality headsets often utilize multiple separate displays positioned close to a user's eyes within a darkened environment, any inconsistencies in the characterization and thus calibration of these separate displays may result in the user noticeably perceiving variations between each display's luminance or color spectrum, potentially souring the user's virtual reality experience. Accordingly, the instant disclosure identifies and addresses a need for improved apparatuses, systems, and methods for accurately characterizing and calibrating high-definition displays.

SUMMARY

As will be described in greater detail below, the instant disclosure describes various apparatuses, systems, and methods for characterizing and calibrating displays. In one example, a display calibration apparatus may include a display mounting assembly with a mounting platform and a multi-axis positioning device coupled to the mounting platform for adjusting an orientation of the mounting platform. The display calibration apparatus may also include a camera device positioned to receive light emitted by a plurality of sub-pixels of a display mounted on the mounting platform. The camera device may include an image sensor array that captures light emitted by the plurality of sub-pixels of the display. In addition, the display calibration apparatus may include a camera lens and a focuser. The camera lens may be positioned to direct light emitted by the plurality of sub-pixels of the display onto the image sensor array of the camera device, and the focuser may be disposed between the camera device and the camera lens to move the camera lens axially along an optical axis of the camera lens.

In some embodiments, the multi-axis positioning device may include a parallel-kinematic structure, such as a 6-axis positioning device. Additionally or alternatively, the image sensor array of the camera device may include a charge-coupled device array.

According to various embodiments, the display calibration apparatus may include a support frame that holds the camera device at a selected position relative to the display mounting assembly. In such embodiments, the focuser may be coupled to the support frame to move the camera lens in a direction toward and/or a direction away from the display mounting assembly, and the camera device may not move relative to the support frame as the focuser moves the camera lens axially along the optical axis of the camera lens.

In certain embodiments, the camera device may include a cooling assembly that cools the image sensor array. The cooling assembly may be disposed in a camera housing surrounding the image sensor array. The cooling assembly may also include a thermoelectric cooling device.

In addition, a corresponding display calibration system may include (i) a display mounting assembly that has a mounting platform and a multi-axis positioning device coupled to the mounting platform for adjusting an orientation of the mounting platform, (ii) a camera device positioned to receive light emitted by a plurality of sub-pixels of a display mounted on the mounting platform (the camera device may include an image sensor array that captures the light emitted by the plurality of sub-pixels of the display), (iii) a camera lens positioned to direct the light emitted by the plurality of sub-pixels of the display onto the image sensor array of the camera device, (iv) a focuser disposed between the camera device and the camera lens to move the camera lens axially along an optical axis of the camera lens, and (v) a calibration computing subsystem that controls each of the display mounting assembly, the camera device, and the focuser.

In some embodiments, the calibration computing subsystem may receive image light information from the camera device. In such embodiments, the calibration computing subsystem may direct the multi-axis positioning device of the display mounting assembly to adjust the orientation of the mounting platform based on the image light information received from the camera device. The calibration computing subsystem may also (i) direct the focuser to move the camera lens axially along the optical axis of the camera lens based on the image light information received from the camera device, (ii) determine a degree to which light emitted by each of the plurality of sub-pixels of the display is focused on the image sensor array, and/or (iii) generate calibration data for driving the plurality of sub-pixels of the display based on the image light information received from the camera device.

In one example, a method for characterizing and calibrating displays may include driving a plurality of sub-pixels of a display mounted on a mounting platform of a display mounting assembly. The display mounting assembly may include a multi-axis positioning device coupled to the mounting platform. The method may also include receiving, from a camera device, image light information obtained by the camera device from light emitted by the plurality of sub-pixels of the display and captured by an image sensor array of the camera device. In addition, the method may include, based on the image light information received from the camera device, directing the multi-axis positioning device of the display mounting assembly to adjust an orientation of the mounting platform and/or directing a focuser to move a camera lens axially along an optical axis of the camera lens. The focuser may be disposed between the camera device and the camera lens, and the camera lens may be positioned to direct the light emitted by the plurality of sub-pixels of the display onto the image sensor array of the camera device.

In some embodiments, the method may further include determining a degree to which light emitted by each of the plurality of sub-pixels of the display is focused on the image sensor array. The method may also include generating calibration data for driving the plurality of sub-pixels of the display based on the image light information received from the camera device. In such embodiments, generating the calibration data for driving the plurality of sub-pixels of the display may include generating a correction factor for driving at least one sub-pixel of the plurality of sub-pixels of the display.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
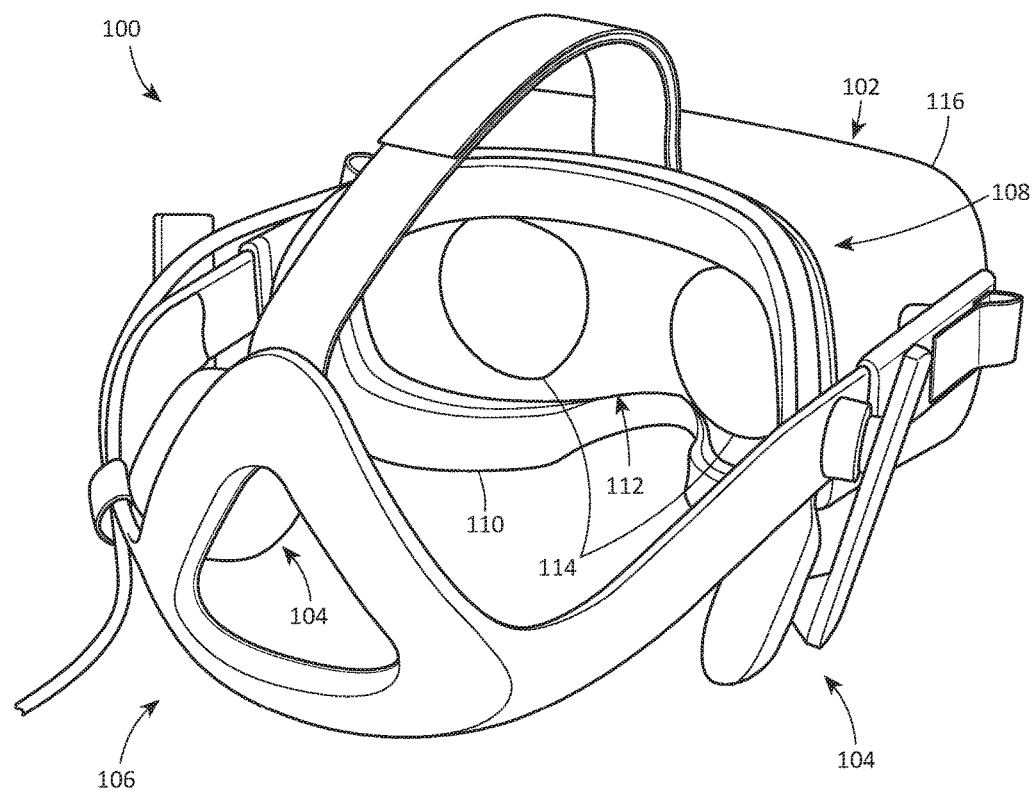
FIG. 1 is a perspective view of an exemplary head-mounted-display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for characterizing and calibrating displays. As will be explained in greater detail below, embodiments of the instant disclosure may include (i) a display mounting assembly having a multi-axis positioning device for adjusting the orientation of a display and (ii) a camera device positioned to receive light emitted by a plurality of sub-pixels of the display mounted on the mounting platform. The disclosed embodiments may also include a camera lens and a focuser disposed between the camera lens to move the camera lens axially along an optical axis of the camera lens. The multi-axis positioning device and focuser may be adjusted in conjunction with each other to precisely position and orient the display and camera lens with respect to the camera device. As detailed below, the precise adjustment of the display and the camera lens relative to each other may enable the camera device to focus on a large region of the display, enabling the camera device to be operated with a large aperture opening that receives a greater amount of focused image light from a light-emitting region of the display in comparison to conventional systems.

Some embodiments may also include a cooling device that cools an image sensor array of the camera, greatly reducing image noise in the sensor array. Additionally, a lens having a high modulation transfer function (MTF) in comparison to conventional systems may further increase the focusing capabilities of the disclosed embodiments. Accordingly, the embodiments described herein may allow for highly detailed and accurate images of a light-emitting region of a display to be obtained. Such images obtained by the camera may allow for light emitted by individual sub-pixels of high-definition displays to be distinguished and accurately measured. Further, a greater region of the image may be focused on and captured in contrast to conventional systems. Thus, more detailed images of an entire light-emitting region of a display may be obtained in a shorter amount of time. The sub-pixel level detail of the images may enable all of the sub-pixels of the display to be illuminated simultaneously, while allowing for the individual sub-pixels to be differentiated and characterized. The disclosed embodiments may therefore facilitate efficient and accurate characterization and calibration of displays.

Figure 2A:
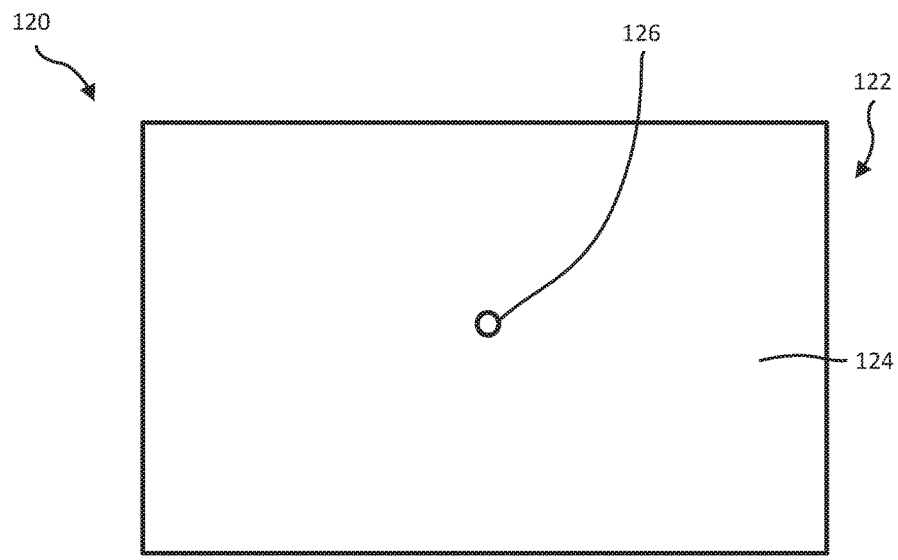
FIGS. 2A and 2B are views of an exemplary display in accordance with some embodiments.
Figure 2B:
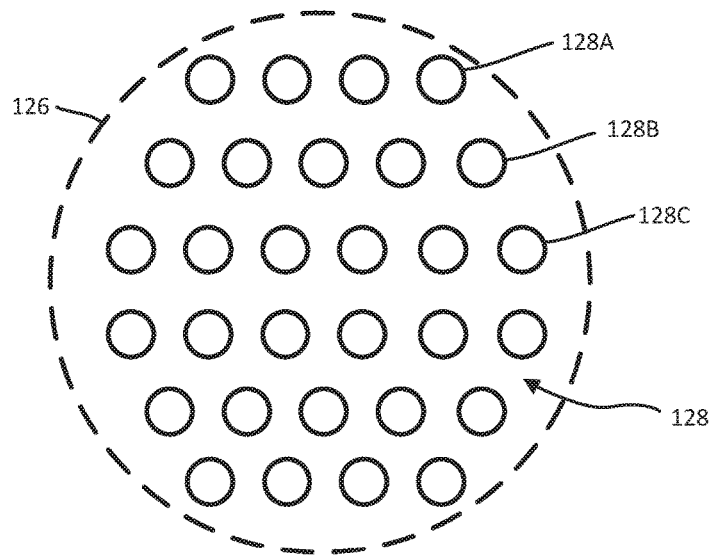
Figure 3:
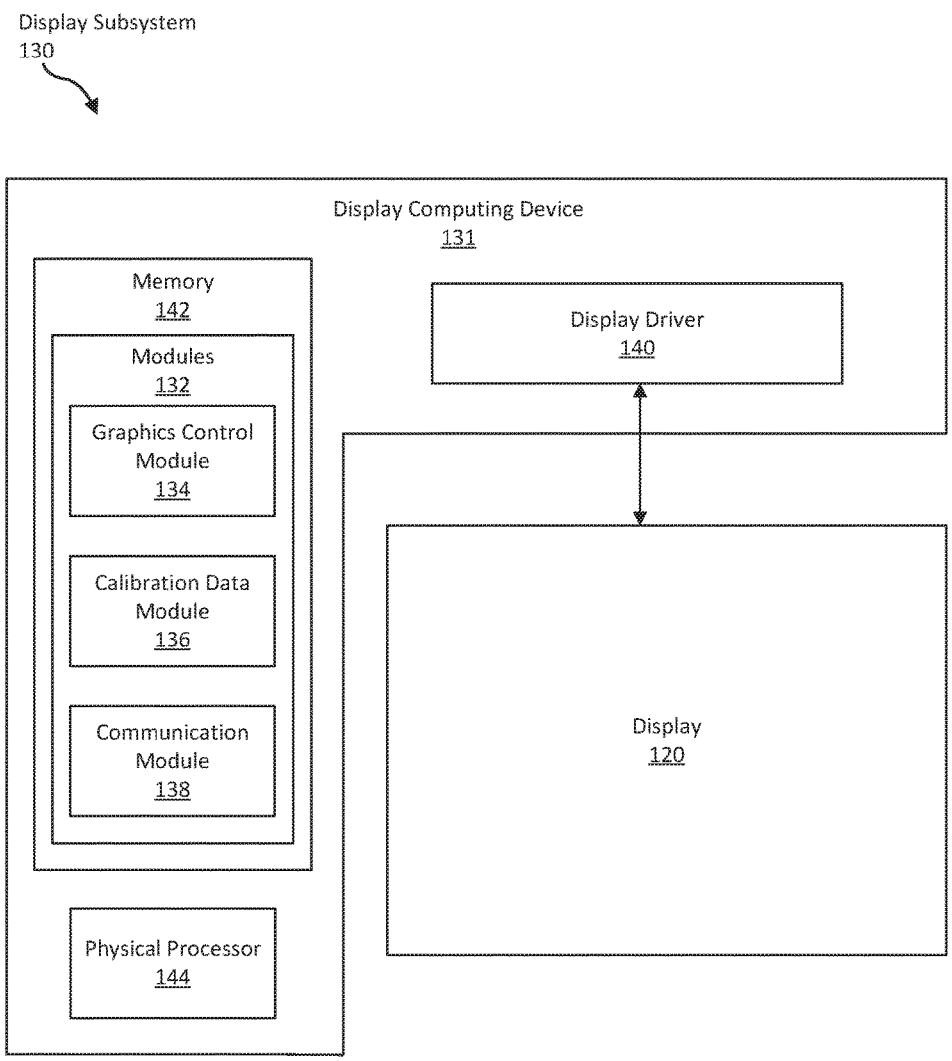
FIG. 3 is a block diagram of an exemplary electronic display device in accordance with some embodiments.

The following will provide, with reference to FIGS. 1-3, detailed descriptions of displays that may be calibrated using the apparatuses, systems, and methods described herein. In addition, the discussion corresponding to FIGS. 4-9 will provide examples of apparatuses, systems, and methods for characterizing and calibrating displays.

FIG. 1 is a perspective view of a head-mounted-display system 100 in accordance with some embodiments. In some embodiments, head-mounted-display system 100 may include a head-mounted-display device 102, audio subsystems 104, a strap assembly 106, and a facial-interface system 108. The term "head-mounted-display device," as used herein, generally refers to any type or form of display device or system that is worn on or about a user's head and displays visual content to the user. Head-mounted-display devices may display content in any suitable manner, including via a screen (e.g., an LCD or LED screen), a projector, a cathode ray tube, an optical mixer, etc. Head-mounted-display devices may display content in one or more of various media formats. For example, a head-mounted-display device may display video, photos, and/or computer-generated imagery (CGI). Head-mounted-display device 102 may include a head-mounted-display housing 116 surrounding various components of head-mounted-display device 102, including lenses 114 and various electronic components, including display components as described above.

Head-mounted-display devices may provide diverse and distinctive user experiences. Some head-mounted-display devices may provide virtual-reality experiences (i.e., they may display computer-generated or pre-recorded content), while other head-mounted-display devices may provide real-world experiences (i.e., they may display live imagery from the physical world). Head-mounted-display devices may also provide any mixture of live and virtual content. For example, virtual content may be projected onto the physical world (e.g., via optical or video see-through), which may result in augmented reality or mixed reality experiences. Head-mounted-display devices may be configured to be mounted to a user's head in a number of ways. Some head-mounted-display devices may be incorporated into glasses or visors. Other head-mounted-display devices may be incorporated into helmets, hats, or other headwear. Examples of head-mounted-display devices may include OCULUS RIFT, GOOGLE GLASS, VIVE, SAMSUNG GEAR, etc.

In some embodiments, audio subsystems 104 may be integrated with head-mounted-display device 102 and may provide audio signals to the user's ears. Head-mounted-display system 100 may, for example, have two audio subsystems 104 located on the left and right sides of head-mounted-display system 100 to provide audio signals to the user's left and right ears, as shown in FIG. 1.

Strap assembly 106 may be used for adjustably mounting head-mounted-display device 102 on the user's head. As shown in FIG. 1, strap assembly 106 may include various straps, such as an upper strap and lower straps, that are coupled to head-mounted-display device 102 to adjustably conform to the top and/or sides of the user's head when the user is wearing head-mounted-display device 102.

In some embodiments, facial-interface system 108 may be configured to comfortably rest against a region of the user's face, including a region surrounding the user's eyes, when head-mounted-display system 100 is worn by the user. In these embodiments, facial-interface system 108 may include a facial interface 110 that contacts selected regions of the user's face. Facial interface 110 may surround a viewing region 112 that includes the user's field of vision while the user is wearing head-mounted-display system 100, allowing the user to look through lenses 114 of head-mounted-display device 102 without interference from outside light while the user is wearing head-mounted-display system 100. Displays (see, e.g., display 120 shown in FIG. 2A) disposed within head-mounted-display housing 116 may be visible to the user through lenses 114. For example, a separate display may be respectively visible to a user through each of lenses 114. The separate displays may each display separate images to each of the user's eyes to together produce images that may be interpreted by the user as three-dimensional images.

FIG. 2A shows an exemplary display 120, such as a display that may be utilized in head-mounted-display system 100 shown in FIG. 1. Additionally or alternatively, display 120 may be a display that is configured for use in any suitable electronic display device, without limitation. For example, display 120 may be a display for use in a television, a computer monitor, a laptop monitor, a tablet device, a portable device, such as a cellular telephone (e.g., a smartphone), a wrist-watch device, a pendant device or other wearable or miniature device, a media player, a camera viewfinder, a gaming device, a navigation device, and/or any other type of device including an electronic display, without limitation.

Display 120 may include a plurality of pixels and sub-pixels that form visible images according to any suitable display technology. For example, display 120 may include image pixels formed of light-emitting diodes (LEDs), organic light-emitting diodes (OLEDs), plasma cells, electrophoretic display elements, liquid crystal display (LCD) components, electrowetting display elements, cathode ray tube (CRT elements), and/or any other suitable image pixel technology. Display 120 may also include a light-emitting region 122 that includes a plurality of sub-pixels that are individually driven by an active matrix of thin-film transistors to form an image that is visible to the human eye. Light may be emitted from a display surface 124 of display 120 such that the images are visible to a user viewing display surface 124. In some examples, images may be produced by driving sub-pixels at different currents and/or voltages such that different amounts of light are emitted from each of the sub-pixels. Various visible colors may be produced by combining different amounts of emitted light from adjacent sub-pixels of different colors (e.g., red, green, and/or blue sub-pixels) such that a user perceives colors corresponding to the combinations of sub-pixels.

FIG. 2B illustrates a portion of display 120, which is magnified to show individual sub-pixel elements of display 120 within sub-region 126. As shown in this figure, display 120 may include various sub-pixels 128 that each emit light having a specified wavelength and/or range of wavelengths. For example, display 120 may include red, green, and/or blue sub-pixel elements that respectively emit red, green, and/or blue light. Additionally or alternatively, display 120 may include sub-pixels that emit any other suitable visible light colors, including, for example, cyan and/or magenta light. For example, FIG. 2B illustrates a plurality of sub-pixels 128A, a plurality of sub-pixels 128B, and a plurality of sub-pixels 128C. In some embodiments, each of sub-pixels 128A may emit light having a first wavelength and/or range of wavelengths (e.g., red light), each of sub-pixels 128B may emit light having a second wavelength and/or range of wavelengths (e.g., green light), and each of sub-pixels 128C may emit light having a third wavelength and/or range of wavelengths (e.g., blue light). Each pixel of display 120 may include at least one sub-pixel 128A, sub-pixel 128B, and sub-pixel 128C. In some examples, each pixel may include more than one sub-pixel 128A, sub-pixel 128B, and/or sub-pixel 128C. Although sub-pixels 128 are illustrated in FIG. 2A as having circular or generally circular peripheries, display 120 may include sub-pixels having any other suitable shape and configuration, without limitation.

According to at least one example, sub-pixels 128 may include individual light-emitting elements, such as organic light-emitting diodes, that emit light having specified colors when a current is passed through the light-emitting elements. The amount of light emitted from each of sub-pixels 128 may be controlled by controlling an amount of current passed through each of the light-emitting elements. Additionally or alternatively, at least a portion of display 120 may be backlit (e.g., by a light source, such as a light-emitting diode light source) and sub-pixel 128A, sub-pixel 128B, and/or sub-pixel 128C may include color filters that allow passage of light having different wavelengths and/or ranges of wavelengths. In such an example, the amount of light emitted from each of sub-pixel 128A, sub-pixel 128B, and sub-pixel 128C may be controlled by a light-blocking layer, such as a liquid crystal layer, that adjusts an amount of light that passes through each of the color filters from a back-light source. The amount of light passing through each of sub-pixel 128A, sub-pixel 128B, and sub-pixel 128C may be controlled by controlling an amount of voltage applied to light-blocking elements of the light-blocking layer corresponding to each of sub-pixel 128A, sub-pixel 128B, and sub-pixel 128C.

FIG. 3 illustrates an exemplary display subsystem 130 that may be utilized in and/or in conjunction with a display device, such as head-mounted-display device 102 shown in FIG. 1. As shown in FIG. 3, display subsystem 130 may include display 120 and a display computing device 131 for controlling display 120. In some embodiments, display subsystem 130 may include a plurality of displays, such as a pair of displays utilized in head-mounted-display device 102. For example, head-mounted-display device 102 may include a pair of displays 120 that are each controlled by a separate display computing device 131. Additionally or alternatively, a pair of displays 120 of head-mounted-display device 102 may both be controlled by a single display computing device 131.

According to at least one embodiment, display computing device 131 may include a display driver 140 for driving sub-pixels of display 120. Display driver 140 may include any suitable circuitry for driving display 120. For example, display driver 140 may include at least one integrated circuit (IC). In some examples, display driver 140 may include timing controller (TCON) circuitry that receives image signals and generates horizontal and vertical timing signals for display 120. Display driver 140 may, for example, be mounted on an edge of a thin-film-transistor (TFT) substrate layer of display 120.

Display subsystem 130 may also include one or more modules 132 for performing one or more display tasks. As shown in FIG. 3, display subsystem 130 may include a graphics control module 134 that provides display data and control signals to display driver 140 for producing images on display 120. Graphics control module 134 may include, for example, a video card and/or video adapter that is used to provide video data and/or display control signals to display 120. In some examples, video data may include text, graphics, images, moving video content, and/or any other suitable image content to be presented on display 120.

In at least one embodiment, display subsystem 130 may include a calibration data module 136 that stores and utilizes calibration data for display 120. For example, calibration data module 136 may include calibration data, such as correction factors, that are applied to video data utilized by display driver 140 to produce calibrated images on display 120. As will be described in greater detail below, such calibration data may be generated by a display characterization and calibration system based on image light data obtained from light emitted by sub-pixels of display 120.

Additionally, display subsystem 130 may include a communication module 138 that receives video data and calibration data from one or more computing devices. For example, communication module 138 may receive video data to be displayed on display 120 from any suitable video and/or image source. Communication module 138 may also, for example, receive calibration data from a display calibration system. In some examples, communication module 138 may also receive user input supplied by a user via an input-output device (e.g., touch screens, buttons, joysticks, click wheels, scrolling wheels, touch pads, key pads, keyboards, microphones, speakers, tone generators, position and/or orientation sensors, vibrators, cameras, sensors, light-emitting diodes and/or other status indicators, data ports, etc.) to display subsystem 130. In at least one example, communication module 138 may also send data from display subsystem 130 to external devices and/or to a user.

Display calibration information may be loaded onto display subsystem 130 during and/or following manufacturing. For example, as will be described in greater detail below, correction factors, such as color, illumination intensity, and/or location-specific correction factors may be generated and stored on display subsystem 130. Such stored correction factors may be accessed during operation of display 120 to produce calibrated images for a user. For example, incoming video data including sub-pixel values for display 120 may be received by communication module 138 and calibration data module 136 may, based on the received sub-pixel values, calculate and apply appropriate correction factors to the sub-pixel values to obtain adapted sub-pixel values.

In certain embodiments, one or more of modules 132 in FIG. 3 may represent one or more software applications or programs that, when executed by a computing device, may cause the computing device to perform one or more tasks. For example, and as will be described in greater detail below, one or more of modules 132 may represent modules stored and configured to run on one or more computing devices (e.g., head-mounted-display device 102 shown in FIG. 1 and/or the computing devices shown in FIGS. 3 and 7). One or more of modules 132 in FIG. 1 may also represent all or portions of one or more special-purpose computers configured to perform one or more tasks.

As illustrated in FIG. 3, example display subsystem 130 may also include one or more memory devices, such as memory 142. Memory 142 generally represents any type or form of volatile or non-volatile storage device or medium capable of storing data and/or computer-readable instructions. In one example, memory 142 may store, load, and/or maintain one or more of modules 132. Examples of memory 142 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 3, example display subsystem 130 may also include one or more physical processors, such as physical processor 144. Physical processor 144 generally represents any type or form of hardware-implemented processing unit capable of interpreting and/or executing computer-readable instructions. In one example, physical processor 144 may access and/or modify one or more of modules 132 stored in memory 142. Additionally or alternatively, physical processor 144 may execute one or more of modules 132 to facilitate calibration of display 120. Examples of physical processor 144 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Figure 4:
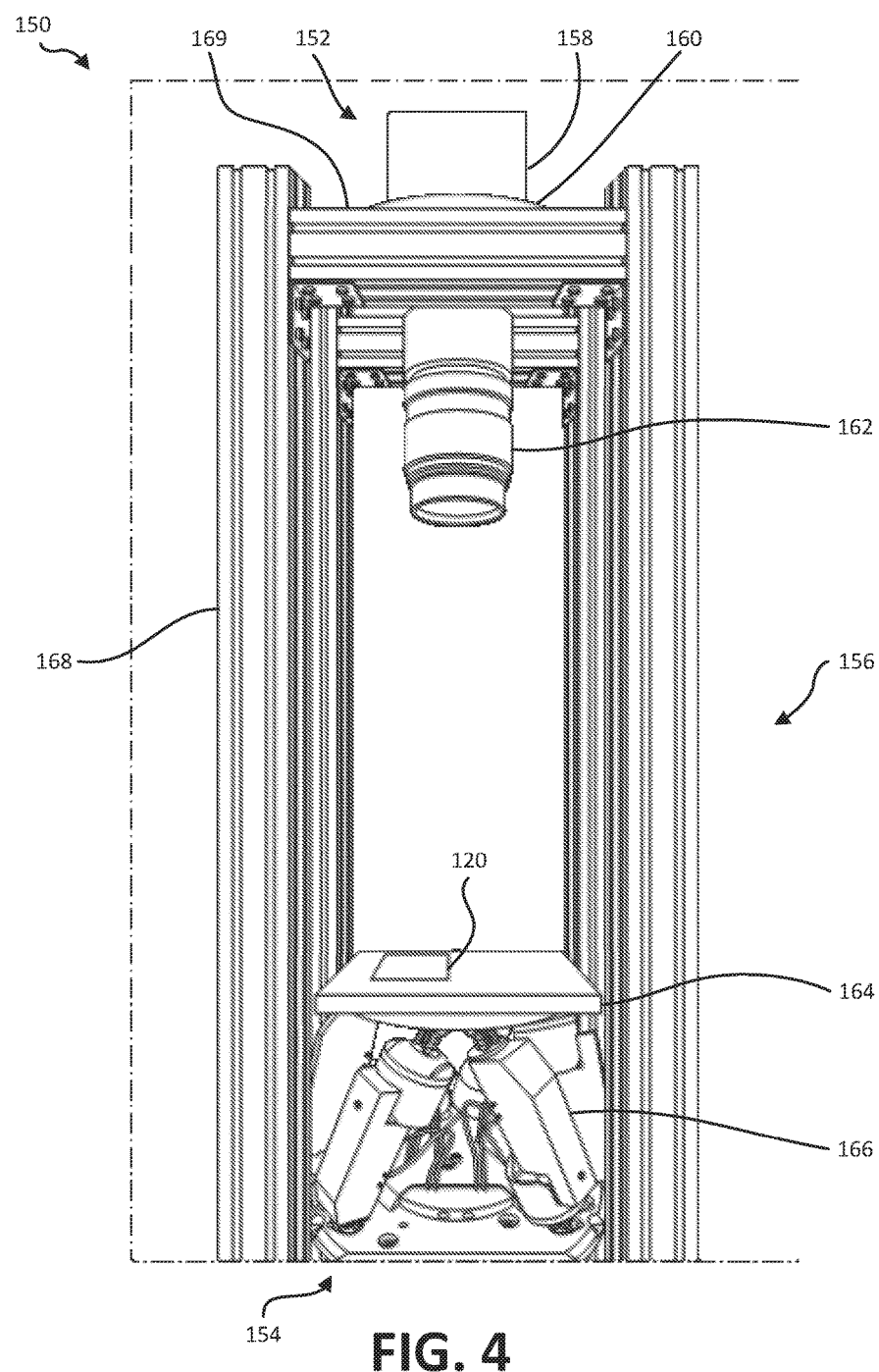
FIG. 4 is a perspective view of an exemplary apparatus for calibrating displays in accordance with some embodiments.

FIG. 4 shows an exemplary display imaging subsystem 150 for positioning displays and obtaining light information from the displays. As shown in this figure, display imaging subsystem 150 may include an imaging assembly 152, a display mounting assembly 154, and a support assembly 156. Imaging assembly 152 may include a camera device 158 that captures light emitted by a light-emitting region 122 of display 120 (see, e.g., FIG. 2A).

As used herein, a "camera device" may generally refer to any suitable camera or imaging device capable of capturing light emitted by a plurality of regions of a display. Examples of a camera device may include, without limitation, digital cameras that convert captured light into digital signals, such as cameras having charge-coupled device (CCD) image sensors, cameras having complementary metal-oxide semiconductor (CMOS) image sensors, and/or any other suitable camera device. A camera device may include a two-dimensional image sensor array, a lens or lens array to focus light on an image sensor array, and a diaphragm that defines an aperture allowing incoming light to enter the camera and impinge on the image sensor array. The image sensor array may include a plurality of pixel sensors (e.g., light-sensing photodiode elements) that capture and measure light emitted from various portions of the display. In some examples, the camera device may also include a microlens array to further focus light on the pixel sensors. The camera device may generate location-specific image light information based on the intensity of the captured light emitted by the various portions of the display. In some embodiments, a camera device may include one or more wavelength filters to filter out various light wavelengths and/or light components, allowing only light within a certain range or ranges of wavelengths to reach the image sensor array. For example, the camera device may include a lens filter disposed on or in a lens or lens array and/or a filter or plurality of filters disposed on the image sensor array.

In some embodiments, camera device 158 may be a high-resolution or ultra-high resolution camera. Camera device 158 may include a CCD sensor array having a resolution of 30 megapixels or more. For example, camera device 158 may include a sensor array having a resolution of at least 50 megapixels. In some examples, as will be described in greater detail below, camera device 158 may include a cooling device that cools the sensor array to reduce noise and increase the imaging accuracy of the sensor array. According to at least one example, camera device 158 may allow for wide aperture and/or long exposure time imaging.

Imaging assembly 152 may also include a focuser 160 and a camera lens 162 coupled to focuser 160 such that at least a portion of focuser 160 is disposed between camera device 158 and camera lens 162. Focuser 160 may include any suitable focusing device configured to adjust a position of camera lens 162 with respect to camera device 158. According to at least one embodiment, focuser 160 may be a high precision focusing device that allows for minute adjustment of camera lens 162. For example, focuser 160 may include a low-noise gyrating member that finally adjusts the location of camera lens 162 relative to camera device 158. In some examples, focuser 160 may include a digital adjustment mechanism that enables precision adjustment of the position of camera lens 162 by an external computing device. Additionally or alternatively, focuser 160 may allow for manual adjustment of the position of camera lens 162. In at least one example, focuser 160 may move camera device 158 toward and away from an image sensor array (e.g., image sensor array 176 shown in FIG. 6) of camera device 158 along an optical axis of camera lens 162. According to at least one example, focuser 160 may be wider than camera device 158 such that at least a portion of focuser 160 may act as a flange member for mounting imaging assembly 152 to support assembly 156.

Camera lens 162 may include any suitable optical lens or lens array to precisely focus light on the image sensor array of the camera device. For example, camera lens 162 may be a camera lens having a relatively high MTF to reduce image distortions and/or inconsistencies derived from the camera lens. Camera lens 162 may be positioned and oriented such that the optical axis of lens 162 is directed toward display 120 mounted on display mounting assembly 154. Accordingly, camera lens 162 may receive light emitted by a plurality of sub-pixels of display 120 and may direct the light toward the image sensor array of camera device 158.

According to some embodiments, as shown in FIG. 4, display mounting assembly 154 may include a mounting platform 164 and a multi-axis positioning device 166. Mounting platform 164 may include a surface or surface region that is shaped and sized to hold and secure display 120. In some examples, mounting platform 164 may be configured to hold multiple displays (e.g., a pair of displays for a head-mounted-display system, such as head-mounted-display system 100 shown in FIG. 1).

Multi-axis positioning device 166 may be coupled to mounting platform 164 and may be configured to move mounting platform 164 in a variety of directions. Multi-axis positioning device 166 may include any suitable positioning mechanism and/or configuration for adjusting a position and orientation of mounting platform 164 so as to correspondingly adjust a position and orientation of display 120. In at least one embodiment, multi-axis positioning device 166 may include a parallel-kinematic structure that allows for precise movement of mounting platform 164 in various directions with respect to imaging assembly 152. For example, multi-axis positioning device 166 may be a 6-axis positioning device (e.g., a 6-axis parallel position system) that provides movement with six degrees of freedom.

Figure 5:
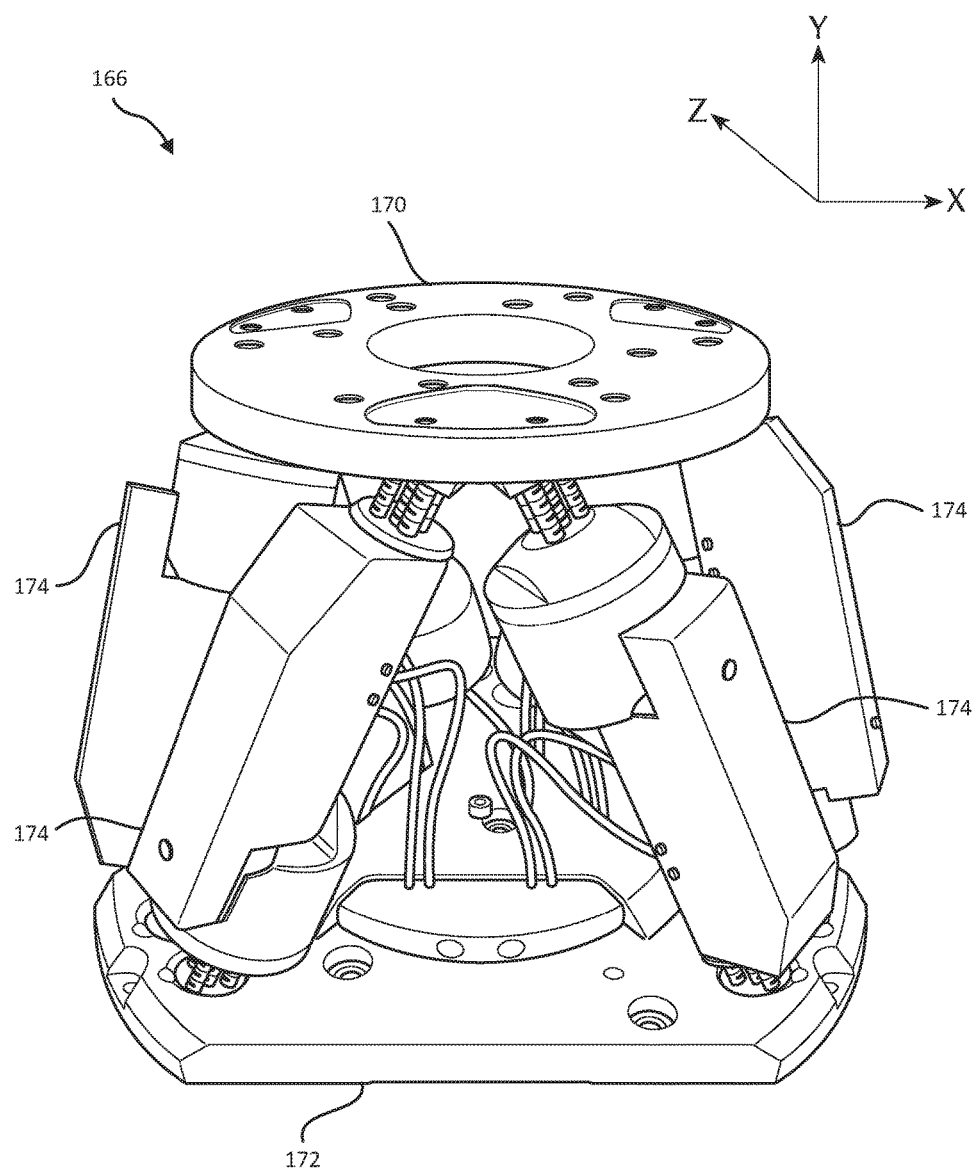
FIG. 5 is a perspective view of a multi-axis position device in accordance with some embodiments.

FIG. 5 shows an exemplary multi-axis positioning device 166 that may be included in display mounting assembly 154. According to at least one embodiment, multi-axis positioning device 166 may be a parallel robot having a parallel-kinematic structure with a 6-axis parallel positioning system (e.g., a Stewart platform, such as a HEXAPOD platform or synergistic motion platform, etc.). As shown in FIG. 5, multi-axis positioning device 166 may include an adjustment platform 170 that may be coupled to mounting platform 164 shown in FIG. 4. Additionally, multi-axis positioning device 166 may include a base member 172 that may be mounted to a support surface (e.g., a support surface of support assembly 156 shown in FIG. 4) and a plurality of actuators 174 (e.g., prismatic actuators, such as electric actuators and/or hydraulic jacks) disposed between base member 172 and adjustment platform 170. For example, multi-axis positioning device 166 may include six actuators disposed between base member 172 and adjustment platform 170.

In some examples, multi-axis positioning device 166 may be controlled by a computing device to move adjustment platform 170, and likewise mounting platform 164, in six degrees of freedom. Additionally or alternatively, multi-axis positioning device 166 may allow for manual operation to move adjustment platform 170. For example, actuators 174 of multi-axis positioning device 166 may be lengthened and/or contracted in a coordinated manner to move adjustment platform 170 linearly in any of the dimensions X, Y, and Z illustrated in FIG. 5. Additionally, actuators 174 of multi-axis positioning device 166 may move adjustment platform 170 rotationally (i.e., pitch, roll, and yaw) in any of the dimensions X, Y, and Z. Accordingly, multi-axis positioning device 166 may enable precise positioning of display 120 in any suitable orientation with respect to imaging assembly 152.

Accordingly, multi-axis positioning device 166 may facilitate positioning of display 120 so that display 120 may be oriented in such a manner that light-emitting region 122 of display 120 (see FIG. 2A), and/or at least a desired portion of light-emitting region 122, is perpendicular or substantially perpendicular to the optical axis of camera lens 162. Such precise positioning of display 120 may enable imaging assembly 152 to precisely focus on a greater portion of light-emitting region 122, allowing for imaging assembly 152 to capture light emitted from light-emitting region 122 using a wide aperture value and/or a long exposure time. By accurately and precisely focusing on and capturing light from at least a portion of light-emitting region 122, imaging assembly 152 may obtain very high-resolution image data from display 120, enabling more accurate characterization of individual sub-pixels 128 of display 120 in comparison to conventional imaging apparatuses and systems. As will be described in greater detail below, image information obtained by imaging assembly 152 based on light emitted by sub-pixels 128 of display 120 may be utilized to accurately calibrate display 120.

Returning to FIG. 4, support assembly 156 of display imaging subsystem 150 may include a rigid support frame that prevents vibration and/or movement of imaging assembly 152 and/or display mounting assembly 154, thereby minimizing or eliminating noise introduced into imaging assembly 152 and/or display mounting assembly 154. Support assembly 156 may include at least one vertical support member 168 that extends vertically to a desired position for mounting imaging assembly 152 over display mounting assembly 154. For example, as shown in this figure, support assembly 156 may include four vertical support members 168. Support assembly 156 may also include at least one imaging-assembly support member 169 for mounting and supporting imaging assembly 152. For example, support assembly 156 may include a pair of imaging-assembly support members 169 extending between corresponding vertical support members 168. According to at least one example, imaging assembly 152 may be positioned between the pair of imaging-assembly support members 169. As shown, for example, in FIG. 4, imaging assembly 152 may be coupled to the pair of imaging-assembly support members 169 at focuser 160. For example, at least a portion of focuser 160 may protrude laterally relative to camera device 158 and camera lens 162 and may be disposed on and/or coupled to upper portions of imaging-assembly support members 169.

Figure 6:
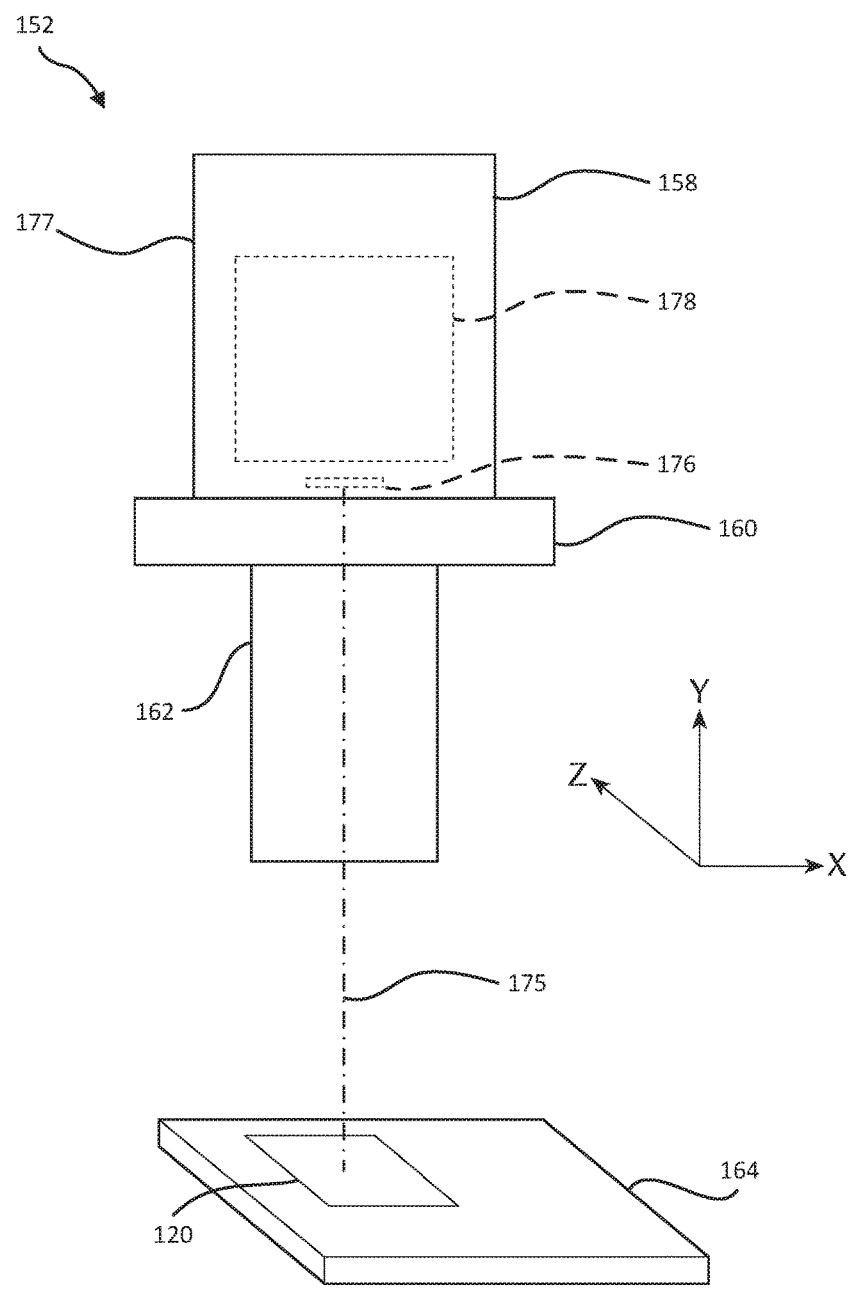
FIG. 6 is a block diagram of an exemplary system for calibrating displays in accordance with some embodiments.

FIG. 6 illustrates imaging assembly 152 positioned over display 120 mounted on mounting platform 164. As described above, focuser 160 may move camera lens 162 along an optical axis 175 of camera lens 162, which is illustrated extending in the Y dimension shown in FIG. 6. Accordingly, focuser 160 may move camera lens 162 along an optical axis 175 toward and away from camera device 158 and display 120. Additionally, multi-axis positioning device 166 shown in FIGS. 4 and 5 may move mounting platform 164, and likewise display 120, linearly and/or rotationally in any of the X, Y, and Z dimensions. In at least one example, mounting platform 164 may be adjusted such that optical axis 175 of camera lens 162 is normal or substantially normal to light-emitting region 122 of display 120.

According to some embodiments, camera device 158 may include an image sensor array 176 disposed within a housing 177 of camera device 158 for capturing light emitted by light-emitting region 122 of display 120. Image sensor array 176 may include, for example, a plurality of CCD image sensors that each generate electrical charge in response to incident light. In at least one embodiment, camera device 158 may also include a cooling assembly 178 cooling at least a portion of camera device 158, including image sensor array 176, to a specified temperature and/or range of temperatures to reduce image noise. For example, cooling assembly 178 may be at least partially disposed within housing 177 and may include one or more thermoelectric cooling devices (e.g., Peltier cooling device) and/or any other suitable cooling device for cooling image sensor array 176. In at least one example, at least a portion of cooling assembly 178, such as a thermoelectric cooling device, may contact at least a portion of image sensor array 176 (e.g., a back portion of image sensor array 176) to remove heat from image sensor array 176. In some examples, cooling assembly 178 may additionally or alternatively include one or more heat sinks that may dissipate heat into a fluid medium, such as air and/or a liquid coolant, that is driven over the heat sinks by, for example, a fan and/or a pump. In some examples, image sensor array 176 may be cooled to a temperature of −30° C. or lower (e.g., −35° C., −40° C., −45° C., −50° C., −55° C., −60° C., −65° C., −70° C., −75° C., −80° C., −85° C., −90° C., −95° C., −100° C., or lower).

Figure 7:
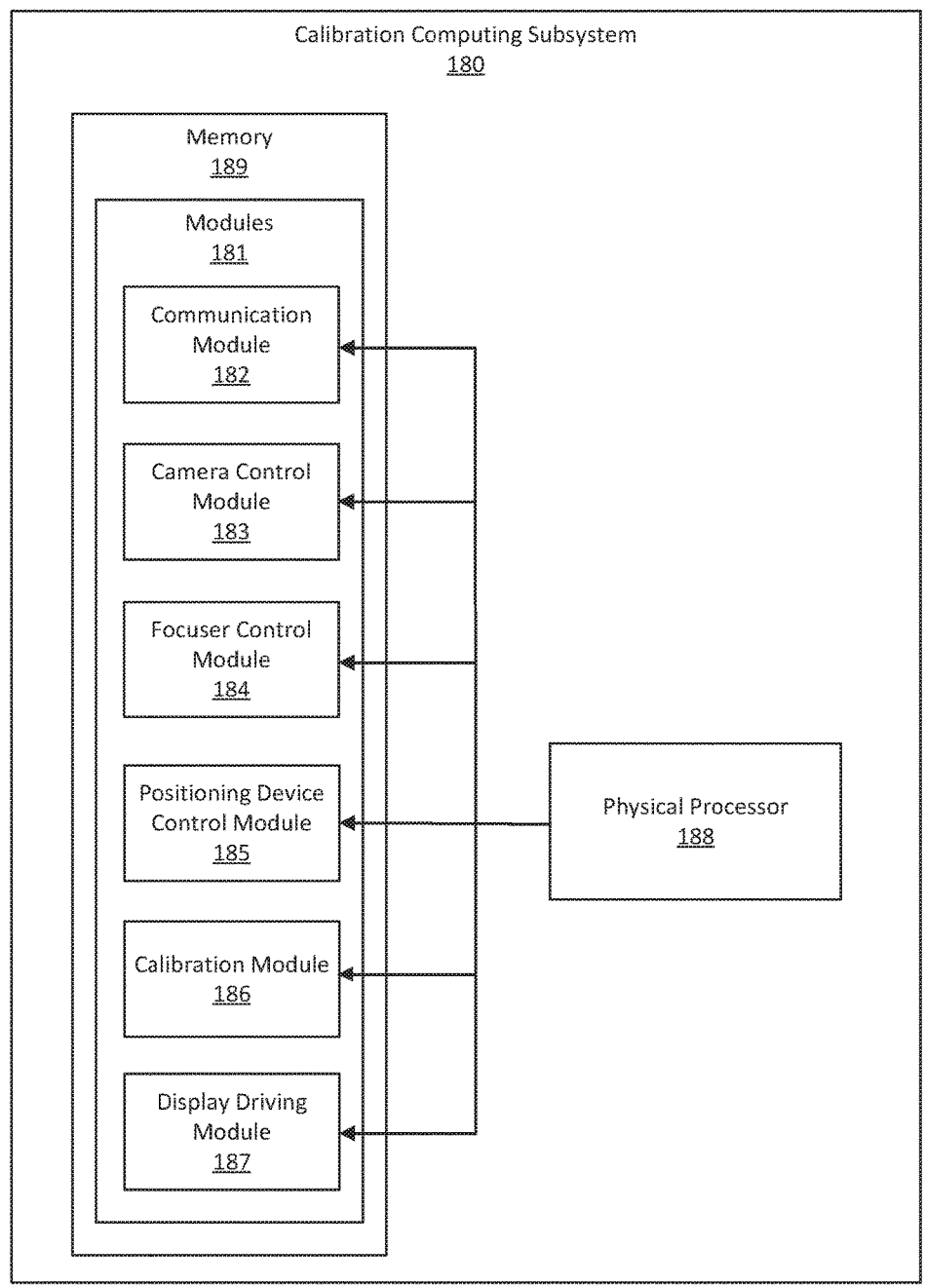
FIG. 7 is a block diagram of an exemplary computing device for calibrating displays in accordance with some embodiments.

FIG. 7 is a block diagram of an exemplary calibration computing subsystem 180 for calibrating a display, such as display 120 shown in FIG. 2A. Calibration computing subsystem 180 may include a single computing device or a plurality of connected computing devices. As illustrated in FIG. 7, calibration computing subsystem 180 may include one or more modules 181 for performing one or more tasks. As will be explained in greater detail below, calibration computing subsystem 180 may include a communication module 182 that communicates with one or more devices, such as camera device 158, focuser 160, display subsystem 130, and/or multi-axis positioning device 166 shown in FIGS. 3, 4, and 6. In addition, calibration computing subsystem 180 may include a camera control module 183 that controls one or more functions of camera device 158. For example, camera control module 183 may direct camera device 158 to capture image light from display 120 to generate image information. Calibration computing subsystem 180 may further include a focuser control module 184 that controls one or more functions of focuser 160. For example, focuser control module 184 may direct focuser 160 to adjust the position of camera lens 162 relative to camera device 158. Calibration computing subsystem 180 may also include a positioning device control module 185 that controls one or more functions of multi-axis positioning device 166. For example, positioning device control module 185 may direct multi-axis positioning device 166 to adjust the position of mounting platform 164. Further, calibration computing subsystem 180 may include a calibration module 186 that generates calibration data for a display, such as display 120, based on light information received from camera device 158. Additionally, calibration computing subsystem 180 may include a display driving module 187 that drives and/or provides data for driving a display, such as display 120. For example, display driving module 185 may provide video and/or other image data to, for example, display subsystem 130 shown in FIG. 3 for driving a plurality of pixel elements in a display region of display 120.

In certain embodiments, one or more of modules 181 in FIG. 7 may represent one or more software applications or programs that, when executed by calibration computing subsystem 180, may cause calibration computing subsystem 180 to perform one or more tasks. As illustrated in FIG. 7, calibration computing subsystem 180 may also include one or more memory devices, such as memory 189. Calibration computing subsystem 180 may also include one or more physical processors, such as physical processor 188. In one example, physical processor 188 may access and/or modify one or more of modules 181 stored in memory 189. Additionally or alternatively, physical processor 188 may execute one or more of modules 181 to facilitate calibration of a display, such as display 120.

Figure 8:
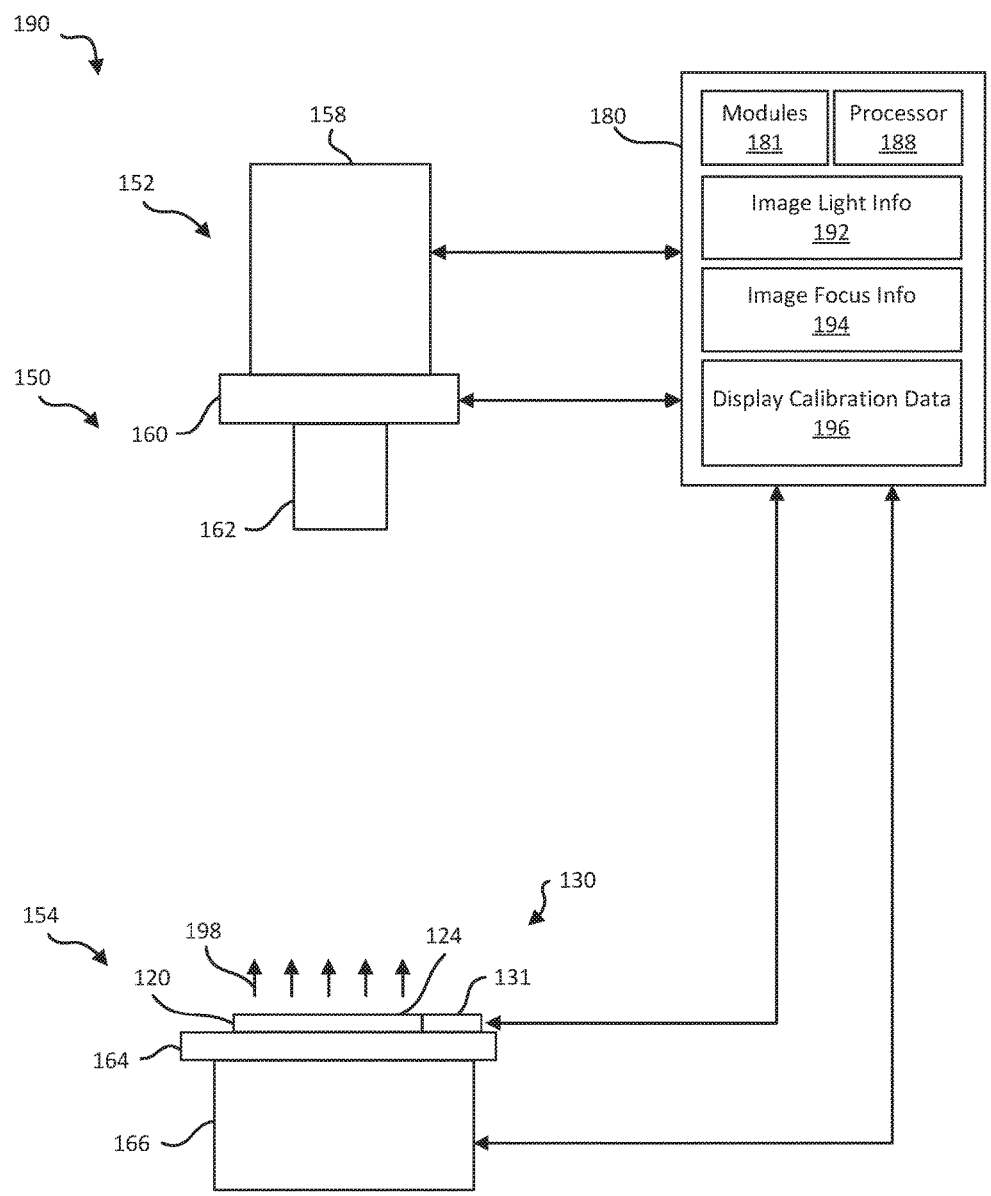
FIG. 8 is a block diagram of an exemplary system for calibrating displays in accordance with some embodiments.

FIG. 8 illustrates an exemplary display calibration system 190 for characterizing and calibrating a display. As shown in this figure, display calibration system 190 may include a display subsystem 130 (see FIG. 3), a display imaging subsystem 150 (see FIG. 4), and a calibration computing subsystem 180 (see FIG. 7). Imaging assembly 152 of display imaging subsystem 150 may be positioned and oriented to face display surface 124 of display 120, as illustrated in FIG. 8. Camera device 158 may receive light emitted by at least a portion of light-emitting region 122 of display 120. For example, camera device 158 may receive light 198 emitted by all or a portion of light-emitting region 122 of display 120 via camera lens 162. Camera device 158 may generate image light information based on the received light emitted by light-emitting region 122. For example, camera lens 162 may focus the emitted light on an image sensor array (e.g., image sensor array 176 shown in FIG. 6) of camera device 158, which may obtain image data for measuring the intensity of light emitted by various regions of light-emitting region 122. In some embodiments, camera device 158 may capture and measure light emitted by light-emitting region 122 in response to instructions sent from communication module 182 of calibration computing subsystem 180. Camera device 158 may then transmit the obtained image light information to calibration computing subsystem 180.

In at least one embodiment, display driving module 187 of calibration computing subsystem 180 may drive sub-pixels 128 of display 120 by sending, via communication module 182, instructions and/or image display data to display subsystem 130 (e.g., to display computing device 131) such that display 120 emits light from at least a portion of light-emitting region 122 in conjunction with light measurements made by camera device 158. Communication module 182 of calibration computing subsystem 180 shown in FIG. 7 may receive image light information 192 from camera device 158. At least one module of calibration computing subsystem 180, such as calibration module 186, may generate image focus information 194 based on image light information 192 received from camera device 158. For example, calibration computing subsystem 180 may determine a degree to which light emitted by one or more sub-pixels 128 of display 120 are focused on image sensor array 176 of camera device 158. For example, sub-pixels 128 in at least a portion of light-emitting region 122 of display 120 may be determined to be out of focus.

According to some examples, based on the image focus information 194, one or more modules of calibration computing subsystem 180 (e.g., focuser control module 184 and/or positioning device control module 185) may direct one or more devices of display imaging subsystem 150 to make one or more adjustments to further bring at least a portion of display 120 into better focus. For example, based on image focus information 194, focuser control module 184 may direct focuser 160 to adjust a position of camera lens 162 relative to camera device 158. Additionally or alternatively, based on image focus information 194, positioning device control module 185 may direct display mounting assembly 154 to adjust the position and/or orientation of mounting platform 164 so as to adjust the position and/or orientation of display 120. Camera control module 183 may then direct camera device 158 to capture and generate additional image light information 192 and transfer the additional image light information 192 to calibration computing subsystem 180. Calibration module 186 may then generate additional image focus information 194 to determine a degree to which light emitted by sub-pixels 128 within at least a portion of light-emitting region 122 of display 120 are focused on image sensor array 176 of camera device 158. This procedure may be repeated one or more additional times until each of the sub-pixels 128 within at least a portion of light-emitting region 122 of display 120 are determined to be focused to a specified degree. In some examples, calibration module 186 may determine that light emitted by sub-pixels 128 in at least a portion of display 120 is focused to a specified degree when light emitted by each of the sub-pixels 128 and/or a specified proportion of sub-pixels 128 may be differentiated (e.g., when light emitted by individual sub-pixels 128 may be differentiated from light emitted by other sub-pixels 128). At this point, imaging assembly 152 may be considered to be focused on at least a portion of light-emitting region 122 of display 120.

Subsequently, image light information 192 may be received from camera device 158 based on focused light from sub-pixels 128 captured by camera device 158, and calibration module 186 may generate display calibration data 196 for display 120 based on this image light information 192. For example, calibration module 184 may analyze data for sub-pixels 128 and/or for various groups of sub-pixels 128 of light-emitting region 122 of display 120 based on image light information 192 and may generate calibration data 196 that includes correction factors to adjust, for example, the light output of one or more sub-pixels 128 and/or groups of sub-pixels 128 of light-emitting region 122. Communication module 182 of calibration computing subsystem 180 may then send the calibration data 196 to display subsystem 130, which utilizes calibration data 196 to drive display 120. In some embodiments, calibration computing subsystem 180 may repeat the calibration process one or more additional times as needed to further calibrate display 120. Accordingly, display calibration system 190 may facilitate real-time calibration of display 120 and may allow for various calibration factors, such as correction factors, to be generated and stored on display subsystem 130 for driving display 120.

Figure 9:
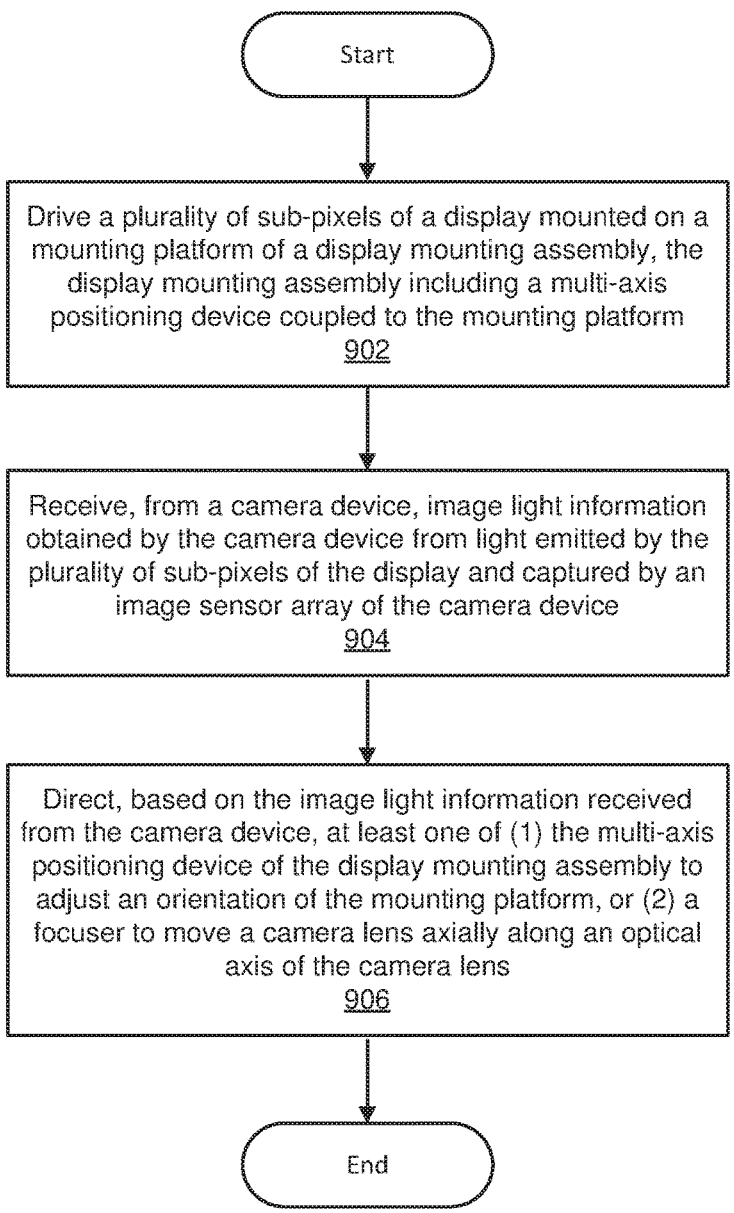
FIG. 9 is a flow diagram of an exemplary method for calibrating displays in accordance with some embodiments.

FIG. 9 is a flow diagram of an exemplary computer-implemented method 900 for calibrating a display. The steps shown in FIG. 9 may be performed by any suitable computer-executable code and/or computing system, including display subsystem 130 in FIG. 3, display imaging subsystem 150 in FIG. 4, calibration computing subsystem 180 in FIG. 7, display calibration system 190 in FIG. 8, and/or variations or combinations of one or more of the same. In one example, each of the steps shown in FIG. 9 may represent an algorithm whose structure includes and/or is represented by multiple sub-steps, examples of which will be provided in greater detail below.

As illustrated in FIG. 9, at step 902 one or more of the systems and/or apparatuses described herein may drive a plurality of sub-pixels of a display mounted on a mounting platform of a display mounting assembly that includes a multi-axis positioning device coupled to the mounting platform. For example, display driving module 187 may, as part of calibration computing subsystem 180, drive a plurality of sub-pixels 128 of display 120 mounted on mounting platform 164 of display mounting assembly 154 (see, e.g., FIGS. 2A, 2B, 4, 7, and 8). In one example, display mounting assembly 154 may include a multi-axis positioning device 166 coupled to mounting platform 164 (see, e.g., FIGS. 4 and 5).

Display driving module 187 may drive the plurality of sub-pixels 128 of display 120 in a variety of contexts. For example, display driving module 187 may send video data and/or other image data to display subsystem 130 via communication module 182. In response, display subsystem 130 may drive, via display computing device 131, the plurality of sub-pixels 128 by selectively applying power and/or driving signals to a TFT array of display 120. In some embodiments, video data and/or other image data supplied by display driving module 187 may specify an illumination intensity for each of the sub-pixels and/or for groups of sub-pixels of display 120.

At step 904 in FIG. 9, one or more of the systems and/or apparatuses described herein may receive, from a camera device, image light information obtained by the camera device from light emitted by the plurality of sub-pixels of the display and captured by an image sensor array of the camera device. For example, communication module 182 may, as part of calibration computing subsystem 180, receive, from camera device 158, image light information 192 obtained by camera device 158 from light emitted by the plurality of sub-pixels 128 of display 120 and captured by image sensor array 176 of camera device 158 (see, e.g., FIGS. 2A, 2B, 5, 7, and 8).

At step 906 in FIG. 9, one or more of the systems and/or apparatuses described herein may direct, based on the image light information received from the camera device, (1) the multi-axis positioning device of the display mounting assembly to adjust an orientation of the mounting platform and/or (2) a focuser to move a camera lens axially along an optical axis of the camera lens. For example, focuser module 184 may, as part of calibration computing subsystem 180, direct, based on image light information 192 received from camera device 158, focuser 160 to move camera lens 162 axially along optical axis 175 of camera lens 162 (see, e.g., FIGS. 6-8). Additionally or alternatively, positioning device control module 185 may, as part of calibration computing subsystem 180, direct, based on the image light information 192 received from camera device 158, multi-axis positioning device 166 of display mounting assembly 154 to adjust an orientation of mounting platform 164 (see, e.g., FIGS. 4-8). In some embodiments, focuser 160 may be disposed between camera device 158 and camera lens 162, and camera lens 162 may be positioned to direct the light emitted by the plurality of sub-pixels 128 of display 120 onto image sensor array 176 of camera device 158.

According to at least one embodiment, one or more of the systems and/or apparatuses described herein may also determine a degree to which light emitted by each of the plurality of sub-pixels of the display is focused on the image sensor array. For example, calibration module 186 may, as part of calibration computing subsystem 180, determine a degree to which light emitted by each of the plurality of sub-pixels 128 of display 120 is focused on image sensor array 176 (see, e.g., FIGS. 6-8).

In some embodiments, one or more of the systems and/or apparatuses described herein may generate calibration data for driving the plurality of sub-pixels of the display based on the image light information received from the camera device. For example, calibration module 186 may, as part of calibration computing subsystem 180, generate display calibration data 196 for driving the plurality of sub-pixels 128 of display 120 based on the image light information 192 received from camera device 158 (see, e.g., FIGS. 7 and 8). In this example, generating the calibration data for driving the plurality of sub-pixels of the display may include generating a correction factor for driving at least one sub-pixel of the plurality of sub-pixels of the display. For example, calibration module 186 may, as part of calibration computing subsystem 180, generate a correction factor for driving at least one sub-pixel 128 of the plurality of sub-pixels 128 of display 120.

As discussed throughout the instant disclosure, the disclosed apparatuses, systems, and methods may provide one or more advantages over traditional display calibration techniques. For example, the disclosed display calibration apparatuses, systems, and methods may utilize a focuser in conjunction with a multi-axis positioning device to provide precise adjustment of a display and a camera lens relative to each other so as to enable a camera device to focus on a relatively large region of the display. Accordingly, the camera device may be operated with a large aperture opening and/or a long exposure time such that the camera device receives a greater amount of focused image light from a light-emitting region of the display in comparison to conventional systems. Some embodiments may also include a cooling device that cools an image sensor array of the camera, greatly reducing image noise in the sensor array. Additionally, a lens having a high MTF in comparison to conventional systems may further increase the focusing capabilities of the disclosed embodiments. Accordingly, the embodiments described herein may allow for highly detailed and accurate images of a light-emitting region of a display to be obtained. Such images obtained by the camera may allow for light emitted by individual sub-pixels of high-definition displays to be distinguished and accurately measured. Further, a greater region of the image may be focused on and captured in contrast to conventional systems. Thus, more detailed images of an entire light-emitting region of a display may be obtained in a shorter amount of time. The sub-pixel level detail of the images may enable all of the sub-pixels of the display to be illuminated simultaneously, while allowing for the individual sub-pixels to be differentiated and characterized. The disclosed embodiments may therefore facilitate efficient and accurate characterization and calibration of displays.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A display calibration apparatus comprising:
 a display mounting assembly comprising:
  a mounting platform; and
  a multi-axis positioning device coupled to the mounting platform for adjusting an orientation of the mounting platform;
 a camera device positioned to receive light emitted by a plurality of sub-pixels of a display mounted on the mounting platform, the camera device including an image sensor array that captures the light emitted by the plurality of sub-pixels of the display;
 a camera lens positioned to direct the light emitted by the plurality of sub-pixels of the display onto the image sensor array of the camera device; and
 a focuser disposed between the camera device and the camera lens to move the camera lens axially along an optical axis of the camera lens.

2. The display calibration apparatus of claim 1, wherein the multi-axis positioning device comprises a parallel-kinematic structure.

3. The display calibration apparatus of claim 1, wherein the multi-axis positioning device comprises a 6-axis positioning device.

4. The display calibration apparatus of claim 1, wherein the camera device further includes a cooling assembly that cools the image sensor array.

5. The display calibration apparatus of claim 4, wherein the cooling assembly is disposed in a camera housing surrounding the image sensor array.

6. The display calibration apparatus of claim 4, wherein the cooling assembly includes a thermoelectric cooling device.

7. The display calibration apparatus of claim 1, further comprising a support frame that holds the camera device at a selected position relative to the display mounting assembly.

8. The display calibration apparatus of claim 7, wherein the focuser is coupled to the support frame to move the camera lens in at least one of a direction toward or a direction away from the display mounting assembly.

9. The display calibration apparatus of claim 7, wherein the camera device does not move relative to the support frame as the focuser moves the camera lens axially along the optical axis of the camera lens.

10. The display calibration apparatus of claim 1, wherein the image sensor array of the camera device comprises a charge-coupled device array.

11. A display calibration system comprising:
 a display mounting assembly comprising:
  a mounting platform; and
  a multi-axis positioning device coupled to the mounting platform for adjusting an orientation of the mounting platform;
 a camera device positioned to receive light emitted by a plurality of sub-pixels of a display mounted on the mounting platform, the camera device including an image sensor array that captures the light emitted by the plurality of sub-pixels of the display;
 a camera lens positioned to direct the light emitted by the plurality of sub-pixels of the display onto the image sensor array of the camera device;
 a focuser disposed between the camera device and the camera lens to move the camera lens axially along an optical axis of the camera lens; and
 a calibration computing subsystem that controls each of the display mounting assembly, the camera device, and the focuser.

12. The display calibration system of claim 11, wherein the calibration computing subsystem receives image light information from the camera device.

13. The display calibration system of claim 12, wherein the calibration computing subsystem directs the multi-axis positioning device of the display mounting assembly to adjust the orientation of the mounting platform based on the image light information received from the camera device.

14. The display calibration system of claim 12, wherein the calibration computing subsystem directs the focuser to move the camera lens axially along the optical axis of the camera lens based on the image light information received from the camera device.

15. The display calibration system of claim 12, wherein the calibration computing subsystem determines a degree to which light emitted by each of the plurality of sub-pixels of the display is focused on the image sensor array.

16. The display calibration system of claim 12, wherein the calibration computing subsystem generates calibration data for driving the plurality of sub-pixels of the display based on the image light information received from the camera device.

17. A method comprising:
 driving a plurality of sub-pixels of a display mounted on a mounting platform of a display mounting assembly, the display mounting assembly comprising a multi-axis positioning device coupled to the mounting platform;
 receiving, from a camera device, image light information obtained by the camera device from light emitted by the plurality of sub-pixels of the display and captured by an image sensor array of the camera device; and
 directing, based on the image light information received from the camera device, at least one of:
  the multi-axis positioning device of the display mounting assembly to adjust an orientation of the mounting platform; or
  a focuser to move a camera lens axially along an optical axis of the camera lens;
 wherein:
  the focuser is disposed between the camera device and the camera lens; and
  the camera lens is positioned to direct the light emitted by the plurality of sub-pixels of the display onto the image sensor array of the camera device.

18. The method of claim 17, further comprising determining a degree to which light emitted by each of the plurality of sub-pixels of the display is focused on the image sensor array.

19. The method of claim 17, further comprising generating calibration data for driving the plurality of sub-pixels of the display based on the image light information received from the camera device.

20. The method of claim 19, wherein generating the calibration data for driving the plurality of sub-pixels of the display comprises generating a correction factor for driving at least one sub-pixel of the plurality of sub-pixels of the display.

* * * * *